Patented Nov. 3, 1936

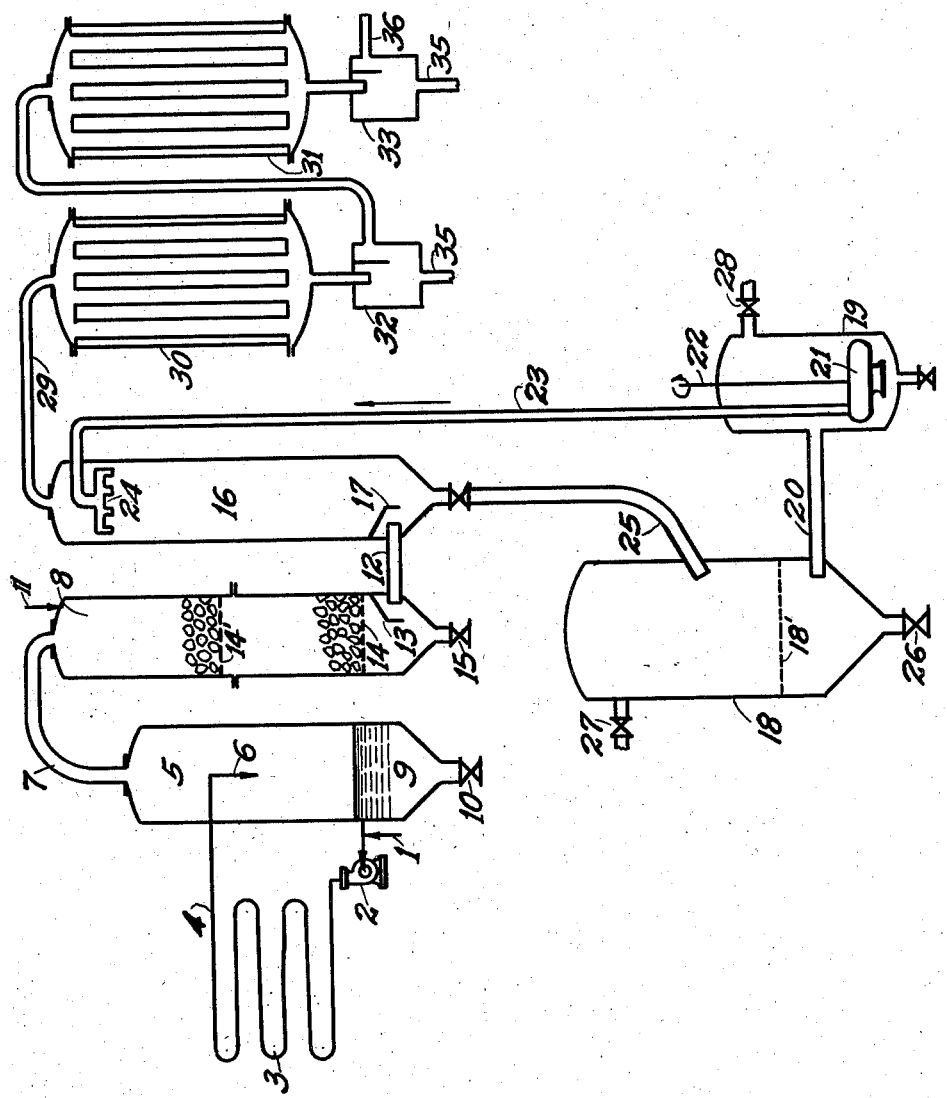

2,059,542

UNITED STATES PATENT OFFICE 2,059,542

PROCESS FOR TREATING OILS

Justin F. Wait, New York, N. Y.

Application April 4, 1933, Serial No. 664,382

11 Claims. (Cl. 204—9)

This invention relates chiefly to methods of treating oils and other hydrocarbons and in particular for the substantial altering of one or more components of the oil which are mixed or associated with substantially or relatively inert mineral oil which is not thus susceptible or appreciably susceptible to altering. This invention is a continuation in part of and related to that described or disclosed in my applications Ser. No. 385,597 filed Aug. 13, 1929, Ser. No. 482,267 filed Sept. 16, 1930, Ser. No. 641,558 filed November 7, 1932 and Serial No. 627,170, filed July 30, 1932.

The reaction while apparently that of fusion is considered as being substantially different in nature from many or most fusions as heretofore recognized. The reaction is that of alkali metals and/or compounds thereof in the substantial absence of water on the substance to be altered. The substance to be altered is generally in association with an inert oil such as petroleum distillate. The method of using such an inert fluid in combination with an alkali compound which is treated with an alkali metal or a derivative such as an amide or other equivalent dehydrating substance has given excellent results in the synthesis of organic substances such as especially prepared oils. Such oils may be derived from crude or partially refined oils by altering certain components therein while seemingly retaining other components thereof in an unchanged or inert state.

The temperature of contact and reaction is that at which fusion occurs. Thus with sodium hydroxide it is above about 320° C. while with potassium hydroxide it is above about 380° C. To obtain greater fluidity the hydroxides of sodium and potassium may be mixed. By such mixtures a mass with a melting point as low as about 250° C. may be conveniently maintained. It is to be noted that for any degree of reaction in fusions the treating mass must be held at a temperature considerably above the temperature of first melting. The mass should be very mobile which condition I have found to be obtainable at about 50° C. or 60° C. above the melting point. With chlorides, sulphates or other salts of alkali or alkali earth or other metals the temperatures of melting are somewhat different. In using them I prefer to form mixtures which melt at about the indicated temperatures or lower. Other metallic substances which may serve as a dehydrating component of the fusion mass include the alkali earth metals and aluminum such as are known to be reactive with water and other hydroxy and hydrogen bearing groups or groups such as —SH and S.

In utilizing compounds such as sodium hydroxide and potassium hydroxide or other compounds of alkali metals and alkali earth metals, I completely dehydrate them before applying them for the alteration of the fusion treatment. A commercially dehydrated caustic is but partially dehydrated. In general such a substance contains from about 1% to 5% of water or the equivalent. The formation of completely dehydrated compounds may be carried out by electrolysis as previously described or substantial reduction in water may be obtained by contacting the fused mass with vapors of mineral oil, benzol, toluol or other substance. In such contact the steps of water removal and removal or altering of impurties of the hydrocarbon may be simultaneously carried out. In general I prefer to further treat such hydrocarbon with dehydrated caustic or other compound containing free alkali metal or with free metal alone or by combination of the two. By impurities I mean those substance which when removed from an oil yield an oil of more desirable form or purity.

In the absence of alkali metal or other dehydrating agent or when the concentrations of the dehydrating agent or of the substance to be altered are low, I prefer to use a temperature in excess of about 400° C. At such temperature special properties of the alkali or compound thereof are available for reaction purposes and probably due to electronic discharge from portions thereof. Thus a metal which at much lower temperatures is mainly a dehydrating agent is usefully applied as a catalytic agent and under conditions favorable to dissociation, activation or rearrangement of the substance to be altered. It is to be noted that with mineral oils the reaction is thus carried out at about the cracking temperature but under catalytic influence.

As previously indicated, the time of contact is very short. I prefer a time of contact of about a second or so or less. A bubbling system of contact gives a time of a fraction of a second but I generally prefer a contacting system wherein the fusion mass is circulated through a tower and vapors contact therewith in which case the alterable form and the inert mineral oil may both be in the vapor phase. I recognize that some portions may be condensed and attached to and be carried away by the circulating mass.

By utilizing the cell at the zone of contact the fusion reaction is improved and apparently due to the activated state of portions discharged from the cell. I thus use a treating agent which has been freshly electrolyzed. Without committing or limiting myself as to the reasons therefor I state that I have found freshly electrolyzed treating agent as being considerably superior to an apparently equivalent agent otherwise prepared as by adding the theoretical ingredients. Increased activity is evidenced by my ability to obtain equal results with a shorter time of contact.

In recirculating the treating mass containing a compound of the metal or a substantial portion thereof through a zone of electrolysis exceptional and desirable activity is assured. It appears that collected substances from treated organic compounds are altered, rendered inert or otherwise treated so that the recirculated mass is exceptionally active as freshly electrolyzed. To utilize such activity the treating zone is about at or closely beyond the zone of electrolysis. Many advantages are realized by placing the treating zone a short distance away from but directly connected to the zone of electrolysis.

The alkali, or other, metallic compound such as sodium hydroxide is a diluting agent and carrying and recovering means as regards alkali metal used therewith however as has been mentioned the hydroxide or other compound may also take part in the alteration especially at the higher temperatures. At lower temperatures, especially after pretreatment, the metal itself may be the predominating treater. Many of the compounds of the metals are quite dense thus for example sodium hydroxide has a density of about two while sodium is less than one. The added hydroxide thus facilitates agglomeration of separated portions and by dilution tempers the action of the metal. It permits of ready separation of agglomerated oily or resinous substances which may become associated therewith. Where the desired amount of alkali metal is somewhat in excess of the solubility in hydroxide, the speed of passage through the zone of electrolysis and other parts is generally sufficient to carry it into the treating zone without agglomeration. In general the amount required is within the amount soluble or the amount which may be so prepared as a mixture.

It is not essential that all of the treating mass be passed through the cell on each cycle of recirculation. Thus from about five percent to about fifty percent may be electrolyzed to maintain the desired composition and activity. Each organic substance to be altered requires trial runs and tests to determine the required amount of electrolysis, the concentration and the temperature required for alteration and/or removal to the extent desired. In some cases impurities are required to be removed in other instances alteration is considered equivalent to removal while in some applications alteration and removal of altered forms are both required. The degree of electrolysis is determined by the results to be obtained and is established experimentally. I find that it is necessary to have the treating mass substantially free from water and to maintain it so wherefor I consider the metal action as being in part that of dehydration. It appears that the altering is of special and desirable form if the water is kept out and the temperature is above the melting points as indicated.

In electrolyzing a fused mass of two compounds my method of flow through in excess of decomposition makes it possible to decompose the compound of lowest decomposition potential to the practical exclusion of decomposition of other compounds. Thus sodium may be liberated preferentially to potassium in electrolyzing a mixture of sodium and potassium hydroxides. Such a mixture in an anhydrous condition or with free metal or both may be used for treatment. I generally prefer to thus gain fluidity by lowering the melting point by two appropriate compounds, one of which may be electrolyzed to form free metal. Thus sodium hydroxide and sodium chloride or other mixtures may be used.

The treatment, especially where dehydration is involved, forms hydroxide of the sodium, potassium, or other metal. By my process of recirculation and use of the cells, the hydroxide so formed is reactive and effects treatment and is subsequently electrolyzed for activation or to produce free metal. Considerable improvement is thus obtainable.

The separation of a component in altered form is facilitated by the inert mineral oil. Thus such oil may be added or a natural part of a treated mass and if present or added utilized to removed altered forms and particularly those such as metallic salts of organic substances as may be formed in or pass through the treatment. The separation of the hydroxide or other compound from the altered substance may be affected by use of other amounts of mineral oil as a carrier fluid and as by settling or filtration or other known means. Such methods eliminate the necessity for diluting in water to recover the hydroxide which of course would be much more costly. My invention may thus involve treatment of an organic substance to promote alteration and subsequent recovery of hydroxide by utilizing mineral oil for segregation of impurities so that the caustic may be reused. Provision may also be made for activating part or all of the so recovered caustic.

The mode of use of the inert oil or portion is determined by cut-and-try methods. In some instances free metal may be associated with hydroxide thus separated from altered organic compound by utilization of substantially inert mineral oil. As regards separation it is immaterial whether the mineral oil is introduced before or after treatment or at both times. By this method I effect a good separation and am able to reuse both metal and associated alkali hydroxide or other metallic compound which may be usable in the fusion mass. The temperature of the alkali may be lowered during the recovery but a part is essentially kept molten during separation and preferably all or nearly all.

The altered portion which may be desired as the main product or as a by-product, or which may be in the nature of impurities to be altered or removed, may be concentrated and in association with a portion, generally quite small, of the hydroxide when the hydroxide is used. The remaining portion of the hydroxide, which is relatively free from the treated or altered chemical, may be readjusted as to its form or components for reuse as in the previously indicated manner of electrolysis. It may then be reused and without the expense of dilution, concentration and dehydration such as is commonly involved in fusion steps of indigo and phenol (from sulfonated benzol) and similar processes and in processes where not entirely anhydrous hydroxide has been used to remove impurities. Substances which would be destroyed by ordinary dehydrator operation may be recovered and those which would be decomposed into undesirable matter may be removed or held at some nominal value. The method of concentration may be determined by trial or experimentation on each particular oil and a skilled person can readily devise procedure which may involve known steps such as settling or filtration by cut-and-try methods using different temperatures for contact and concentration and different compositions of the fusion mass.

I prefer to carry out the fusion treatment with mixtures of compounds of alkali metal with the resulting increased fluidity with respect to a single compound, say a hydroxide, alone. The metal capable of dehydrating at the temperature of fusion may be used in one or more of the fusion or treating stages. Readjustment of the composition is required to compensate for consumption, loss or addition of substances.

A hydrocarbon to be treated may be introduced in a solid or liquid form which may be thoroughly mixed to form a substantially uniform fusion mass. The mixture may be either homogeneous or heterogeneous. I generally prefer to pass the hydrocarbon in a vaporous form into contact with a hydroxide or other alkaline substance or mixture. This may be done in successive stages of bubbling but I prefer contact as in a tower through which the liquid fusion mass is recirculated while vapors to be treated pass therethrough. A number of treating stages may be used with different temperatures and/or composition of the components. It is quite essential that the system be kept closed with exclusion of free air especially when free alkali or other metal is used. The structural parts are preferably such that vaporous form may be had at the indicated temperatures of reaction. Thus high boiling substances require vacuum. A gas or light or heavy vapor may be used as a carrier for relatively non-volatile portions of organic substance to be treated.

In applying my process commercially, as to the treatment of petroleum distillate, advantage may be taken of the fact that the hydrocarbon to be treated is at one or more stages already in the vapor form. For example a hydrocarbon mixture such as the vaporous fluid from a cracking process is frequently at about 400° C. and sometimes considerably in excess thereof. Under such conditions the quick use of highly active or ionized gaseous fluid containing gases and fluids leads to results otherwise not attainable as equilibrium is thus reached or approached in the vapor phase while in contact with exceptionally active substances such as an alkali metal or mixture of dehydrating metal and fused compound such as sodium hydroxide or mixtures of such compounds. The preferred use of freshly electrolyzed hydroxide (or other compound) may be combined with treatment of freshly cracked or activated organic substance (such as oil) to be treated. The organic substance to be treated is obviously required to be rendered nearly or totally anhydrous before contact with dehydrating metal.

Hydrocarbon in this form may be passed through my process with little expenditure for heat as would otherwise be required for evaporation. A multiplicity of treating zones may be used and held at gradient temperatures and heat caused to pass from the vapors into the fused alkaline compound held in one or more stages. Heat may be applied to some of the treating stages to overcome radiation or for other purposes. Heat may be radiated or abstracted to promote partial condensation of vapors between or during treating stages.

A gas such as hydrogen or methane may be caused to enter the reaction and so cause hydrogenation and/or formation of additional products. To this end such gas may be caused to become mixed with a vapor of a hydrocarbon if not already associated therewith. This form of reaction is made more positive by fairly high intensity of electrical discharge preferably at or near the zone of contact. A preference is had for a separate zone of contact with such gases and means for immediately and quickly passing the electrolyzed substance into the treating tower or zone whereat the organic matter to be treated is had.

After the fusion has been completed, the organic salt may in some cases be recovered by concentration or nearly complete separation from the alkali compound by filtering. A fluid material such as a mineral oil is added it may facilitate this separation. The operation is preferably such that the alkali compound or part thereof may be recovered and received without such a large expense of diluting as is ordinarily resorted to. If filtering or settling is used well known procedure may be used with the special feature of excluding free air or maintaining gaseous or vaporous hydrocarbon or hydrogen or other reducing atmosphere over the alkali metal, hydroxide or other substances that may be in the melt selected for treating the particular oil or other hydrocarbon which is to be treated.

This description and the examples mentioned above show some of the possible applications of my invention, but I do not limit my claims to the exact details described herein. The following is given as a particular illustration of an arrangement of apparatus which may be used for carrying out the invention with one particular oil containing substance alterable by alkali metal.

The drawing shows a pipe line 1 for introducing oil to be treated. A circulating pump 2 passes the oil through pipe still 3 schematically illustrated. Outlet 4 connects with soaking chamber 5 whereat the heated and partially vaporized oil discharges through distributor 6. The temperature may be at about 400° C. or above whereat cracking occurs. Vapors formed by evaporation and cracking pass through line 7 to chamber 8 while liquid collects at 9 and may be recirculated through the heating lines 3. Other and known procedure and means may be used for promoting evaporation and/or cracking. Line 10 may be used to withdraw liquid from 9 or to introduce heated vapors or for other purpose.

Hydrogen or fixed gases or vapors or mixtures thereof may be introduced into vessel 8 as by means of line 11 and discharged therefrom by line 12 protected by baffle 13. Supports 14 may be used to hold catalytic material to promote reaction of parts of the contents of 8 and for purposes of mixing the vapors from 5 with the gaseous fluid introduced through 11 and which fluid is preferably freshly produced or activated by heating or electronic discharge. Heat may be applied to the contents of vessel 8 or slight cooling may be used depending upon the procedure established by experimentation. Line 15 may be used for drawing resinous or other substances deposited upon the catalyst or adsorptive surface held within vessel 8.

Gases and vapors enter the contact zone 16 which may be in multiple with different conditions of temperature or treating agent(s) through line 12 with protecting baffle 17. Treating agent and substances which may be carried therewith are passed to vessel 18 and then to vessel 19 by means of line 20. A pump 21 driven by shaft 22 may be used to circulate the treating agent through line 23, distributing header 24 and return line 25. The cracking and/or rearrangement or addition may continue through to vessel 18.

Vessel 18 may contain a metallic filter cloth for filtration of used treating agent. Relatively inert mineral oil may be introduced through 26 and distributed through a header within vessel 18 preferably above line 20. The concentrated collected altered products may be discharged as through line 27. The mineral oil in the illustrated arrangement may be introduced intermittently and vessel 18 may be provided with an agitator. The corresponding steps of separation may be carried out in a separate vessel. Line 28 may be used for introducing treating agent or for maintaining inert gaseous or liquid fluid over the contents of vessel 19. A cell for electrolysis may be inserted between vessels 18 and 19 or at other suitable point.

Treated vapors are shown as leaving vessel 16 by line 29 connecting with condensers 30 and 31 provided with separator 32 and 33 and liquid outlets 34 and 35. Line 36 may connect with other condensers or other refining means and to pressure control device to give the desired pressure or vacuum. The temperature of the cooling fluid of condensers 30 and 31 may be adjusted so as to give the desired kind of effluent from separator 32 and 33. The first condenser may throw out resinous or other form of altered substance which is to be separated from other gaseous fluid. Towers with absorptive or adsorptive materials may be used and other fractionation or separating means may be employed.

The oil introduced at 1 may be a mixture of low sulfur (or other quality) oil and a higher grade of oil. The vaporous or gaseous fluid may be of another source or sort. One of the towers 16 may treat with anhydrous alkali hydroxide while another may treat with a high percentage of alkali metal or nearly pure metal.

The action of the experimentally selected inert mineral oil may be that of a carrier or it may be that of a solvent or both. Substances removed or concentrated thereby may be recovered for use or thrown away depending upon their nature. The relatively inert mineral oil may then be recovered for reuse or for treatment with alkali metal or hydroxide or other of the described treating agents. The use of an active condition of contact for high vapors or fixed gases promotes rearrangement and chemical combination and results in final improvement in yield and/or quality of oil so treated. In gasoline preparation and treatment low boiling aromatic substances are increased in yield. With heavy distillate the color and viscosity index and other properties are improved. Liquid from 9 may be treated in the liquid phase with the described treating agents of the fusion type.

The illustration and the description are for guide only. It is recognized that experimentation may be required for each oil or other organic substance to be treated. The illustrated counter-current flow is considered undesirable with some treating agents such as nearly pure metal with which I prefer concurrent flow in the treating zone. Modification is made to yield desired and obtainable stability, color, viscosity, viscosity index and similarly varied factors or altered properties.

I claim:

1. The process of refining oil of petroleum containing heavy constituents and a portion alterable by alkali metal which comprises flowing the oil through a pipe still while controlling the pressure to vaporize substantially all of the oil at about 400° C., separating formed vapors with some cracked portions from non-evaporated oil, flowing the vapors through a zone of contact with a molten mass comprised largely of an alkali compound and alkali metal, causing motion of the molten mass and the oil vapors so as to insure thorough treatment while substantially continuously freshening the mass by electrolysis of portions thereof, so altering and removing alterable portions and promoting rearrangement and formation of some light hydrocarbons, removing light hydrocarbons and so forming purified oil of lubricating range.

2. The method of claim 1 wherein oil residual to the vapors is recirculated through the pipe still with fresh oil so that substantially all of the oil is evaporated and treated in like manner.

3. In refining petroleum by altering an organic compound such as those contained in oil which may be beneficially altered in chemical composition by treatment with water free alkali hydroxide and which is held in admixture with a substantially inert mineral oil, the steps which comprise evaporating the mixture under its boiling pressure at about 400° C. and contacting the vapors with an alkali hydroxide which is maintained free from water by alkali metal and holding the mixture in contact relation therewith at about 400° C. for a very short period to alter the compound and while avoiding liquid oil hydroxide contact, separating, recovering and reusing the alkali hydroxide for similar purposes in cyclic manner and separating and recovering inert mineral oil from the altered compound.

4. The process of refining oil which comprises flowing alkali hydroxide through a zone of electrolysis to render the same anhydrous and to form a small amount of free metal, flowing the electrolyzed mass through a connected reaction zone and contacting it with a mixture of inert and alterable mineral oil at an elevated temperature of about 400° C. to produce chemical change of alterable portions thereof while avoiding substantial change of inert portions and recovering and similarly reusing the inert oil for treatment of subsequent portions of the substance and with recovered and freshly electrolyzed portions of the hydroxide.

5. The process which comprises electrolyzing a fused hydroxide of an alkali metal by passing it through a zone of electrolysis at a rate above that of decomposition and flowing the freshly formed product of electrolysis containing a dehydrating agent of metal released by electrolysis quickly into contact with an alterable organic substance like those of petroleum contained in association with relatively inert mineral oil and wherein the substance may be beneficially rearranged to form a different chemical compound by treatment with water free hydroxide containing alkali dehydrating agent, and maintaining the masses in contact relation for a period of less than about two seconds at a temperature of about 400° C. and so desirably altering the substance to form the compound, and quickly separating the compound from the oil and the hydroxide.

6. The process of safely and efficiently refining mineral oil which comprises electrolyzing a fused compound of an alkali metal to form alkali metal, quickly flowing the metal as formed in admixture with fused anhydrous alkali hydroxide through a zone of contact with vapors of mineral oil containing an alterable portion at a temperature in excess of about 50° C. above the melting point of the hydroxide while avoiding appreciable reaction between the metal mixture and liquid oil and in a manner to desirably alter the alterable portion and recovering and electrolyzing the hydroxide while maintaining it molten and free from air.

7. The process of increasing the viscosity index of heavy oil while altering and removing impurities therefrom which comprises contacting vapors of the oil under vacuum with an alkali metal contained in a fused anhydrous mixture containing alkali hydroxide at a temperature of about 400° C. while limiting the time of contact to less than about two seconds and so promoting chemical rearrangement of the oil to substantially increase the viscosity index and wherein the fused mass is utilized to remove altered impurities from the zone of contact.

8. The process of refining mineral oil which comprises forming and rapidly flowing a mixture of molten alkaline mass carrier of a density of about two and a decomposable alkali metal compound and free alkali metal downwardly through a reaction zone at rapid rate, flowing oil vapors that have been formed at about 400° C. through the reaction zone under about the pressure of their formation avoiding the contact of liquid non-evaporated oil with the mass, so altering impurities of the oil and collecting them and carrying them out of the reaction zone about as they are formed by flow of the mass, and maintaining the flowing alkaline mass molten and in cyclic flow through the reaction zone and portions through a zone of separation of altered impurities and a zone of electrolysis while excluding air from the free metal and maintaining it molten throughout its existence.

9. The continuous method of refining oily hydrocarbons with a freshly electrolyzed product of an alkali compound such as the hydroxide or chloride which comprises flowing the compound in fused form through a zone of electrolysis and quickly and directly into a closely located pipe connected reaction zone and therethrough in stream form, simultaneously evaporating oily hydrocarbon at roughly 400° C. and under the boiling pressure of that oil at that temperature and flowing the vapors through the reaction zone under substantially that pressure and controlling the flow so that the time of contact of vapors and fresh product of electrolysis is about a second or so, and so altering impurities of the oil and carrying them away with the stream of compound, recovering the compound and returning portions to the zone of electrolysis and wherein an amount of compound about equal to the amount electrolyzed, or greater, up to about twenty times that amount is recirculated through the reaction zone without electrolysis.

10. The process of forming and utilizing molten alkali metal which comprises subjecting decomposable fused alkali compound to electrolysis and flowing said compound containing released free metal through a reaction zone into contact with hydrocarbon vapors held at about 400° C., rapidly flowing the so treated vapors through a second reaction zone and into contact with a molten alkaline mass containing alkali metal and while flowing the alkali of the first reaction zone in cyclic manner through that zone and the zone of electrolysis.

11. The process of purifying hydrocarbons which comprises rapidly flowing the hydrocarbons through a series of reaction zones held at roughly 400° C., flowing a stream of molten alkali compound containing free alkali metal through the reaction zones to promote purification of hydrocarbon therewithin, and flowing molten alkali discharged from one of the reaction zones in cyclic manner through that zone and a zone of electrolysis whereat it is electrolyzed.

JUSTIN F. WAIT.